(12) United States Patent  
Carrere et al.

(10) Patent No.: US 9,227,375 B2  
(45) Date of Patent: Jan. 5, 2016

(54) PROCESS FOR BONDING TWO PARTS SUBJECTED TO TENSILE FORCES, BONDED PARTS OBTAINED

(71) Applicant: EPSILON COMPOSITE, Gaillan en Medoc (FR)

(72) Inventors: Noel Carrere, Cestas (FR); Anatole Ciccone, Saint Laurent Medoc (FR)

(73) Assignee: EPSILON COMPOSITE, Gaillan en Medoc (FR)

( * ) Notice: Subject to any disclaimer, the term of this patent is extended or adjusted under 35 U.S.C. 154(b) by 13 days.

(21) Appl. No.: 14/057,021

(22) Filed: Oct. 18, 2013

(65) Prior Publication Data

US 2014/0112708 A1   Apr. 24, 2014

(30) Foreign Application Priority Data

Oct. 18, 2012   (FR) ..................... 12 59920

(51) Int. Cl.
*F16B 7/00* (2006.01)
*B32B 1/08* (2006.01)
(Continued)

(52) U.S. Cl.
CPC ................ *B32B 1/08* (2013.01); *F16B 11/006* (2013.01); *F16B 11/008* (2013.01); *B29C 65/48* (2013.01); *B29C 65/542* (2013.01);
(Continued)

(58) Field of Classification Search
CPC .... B32B 1/08; B32B 1/006; B29C 66/12441; B29C 66/1246; B29C 66/534; B29C 66/721; B29C 66/742; B29C 65/48; B29C 65/542; Y10T 403/551; Y10T 403/5753; Y10T 403/5761; Y10T 403/47; F16L 13/103; F16L 13/11; F16L 13/116; F16L 13/122; F16L 13/142; F16C 7/026; F16B 11/006; F16B 11/008; B29L 2031/06
USPC .................. 403/286, 293, 294, 341, 404, 265
See application file for complete search history.

(56) References Cited

U.S. PATENT DOCUMENTS 3,545,795 A   12/1970   Hertel et al.
4,238,539 A * 12/1980   Yates et al. ................... 428/35.9
(Continued)

FOREIGN PATENT DOCUMENTS

EP   0 046 869   3/1982
EP   2 508 764   10/2012

OTHER PUBLICATIONS

International Search Report dated Jun. 3, 2013, corresponding to the Foreign Priority Application No. 12 59920.

*Primary Examiner* — Gregory Binda
*Assistant Examiner* — Nahid Amiri
(74) *Attorney, Agent, or Firm* — Young & Thompson

(57) ABSTRACT

A process for producing a bonded connection between first and a second parts, with a length of superposition around a longitudinal axis, these parts being subjected to forces in at least one longitudinal direction, includes producing a bonded connection having at least one interior and/or exterior adhesive joint, over the length between the parts, the joint having a cross-section around the longitudinal axis, the thickness of the joint varying from a free edge on the end-fitting side, to the other free edge on the tube side, and following the direction of forces to which the parts are subjected so as to better distribute the overstresses over at least one part of the length. At least one adhesive joint is produced, having in the longitudinal direction a large thickness facing each of two free edges relative to the thickness in a median part.

19 Claims, 6 Drawing Sheets

(51) Int. Cl.
*F16B 11/00* (2006.01)
*B29L 31/06* (2006.01)
*B29C 65/48* (2006.01)
*B29C 65/54* (2006.01)
*B29C 65/00* (2006.01)
*F16C 7/02* (2006.01)

(52) U.S. Cl.
CPC ...... *B29C 66/1246* (2013.01); *B29C 66/12441* (2013.01); *B29C 66/534* (2013.01); *B29C 66/721* (2013.01); *B29C 66/742* (2013.01); *B29L 2031/06* (2013.01); *F16C 7/026* (2013.01); *Y10T 403/47* (2015.01)

(56) References Cited

U.S. PATENT DOCUMENTS

| | | | | |
|---|---|---|---|---|
| 4,256,412 | A * | 3/1981 | Tybus et al. | 403/267 |
| 4,792,320 | A * | 12/1988 | Nickel | 464/181 |
| 5,318,374 | A * | 6/1994 | Rumberger | 403/277 |
| 6,910,617 | B2 * | 6/2005 | Yablochnikov | 228/115 |
| 7,007,982 | B2 * | 3/2006 | Ishii et al. | 285/223 |
| 7,427,237 | B2 * | 9/2008 | Burkett | 464/181 |
| 8,205,315 | B2 * | 6/2012 | Mullen et al. | 29/447 |
| 8,365,502 | B2 * | 2/2013 | Allen et al. | 52/843 |
| 8,876,614 | B2 * | 11/2014 | Nakamura et al. | 464/181 |

* cited by examiner

PROCESS FOR BONDING TWO PARTS SUBJECTED TO TENSILE FORCES, BONDED PARTS OBTAINED

This invention relates to a process for bonding two parts subjected to tensile forces creating shear stresses in adhesive film.

The invention also covers the bonded parts that are thus obtained.

Figure 1:
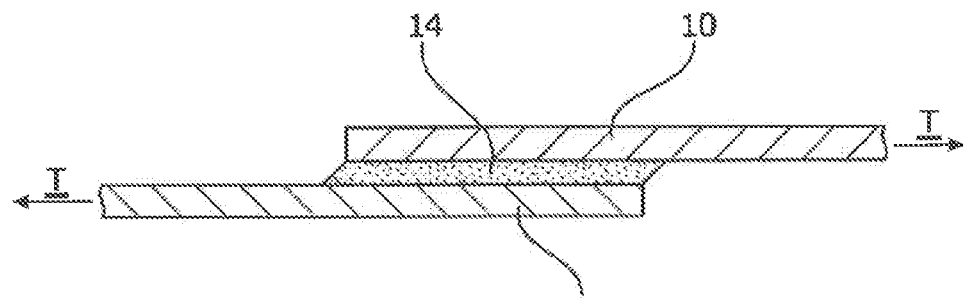

As the "Prior Art" FIG. 1 illustrates, when two parts (10, 12) are assembled by bonding between their parallel surfaces, it is known to produce an adhesive film 14 that is relatively thin and that has an approximately constant thickness.

In such an assembly, tensile forces or compressive forces undergone by the parts (10, 12) or dimensional variations between the two parts (10, 12) are able to create components of traction T that are longitudinal and perpendicular to the assembly surface.

These components of traction T create in the adhesive film a deformation that is comparable to shearing. Finally, this deformation causes longitudinal shear stresses in the adhesive film 14.

Via tests or digital simulations, a non-homogeneous distribution of shear stresses is noted within the adhesive film 14, with a heavy stress on the ends of the adhesive film 14 and a weak stress on the adhesive film 14 in its central zone.

Figure 2:
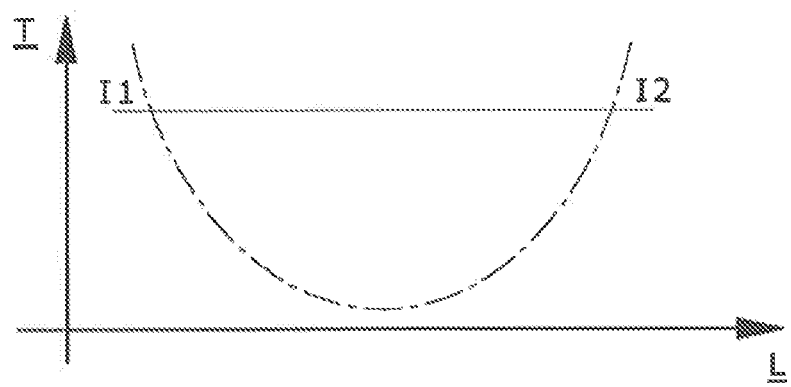

The "Prior Art" FIG. 2 provides an example of a typical profile of shear stresses observed in an adhesive film 14, with the profile varying with a minimum in the median part and a maximum at the ends of the adhesive film.

This concentration of stresses is obtained essentially from the deformation of the parts (10, 12) that are assembled under the action of the longitudinal components of traction T.

However, this concentration of stresses can also be aggravated by other factors such as:

Differences in the modulus of elasticity between the adhesive film 14 and the material of the parts (10, 12) to be assembled, Differences in the modulus of elasticity between the different materials of the parts (10, 12) to be assembled, carbon and metal, for example, Differential expansions under thermal stresses of the parts (10, 12) to be assembled, with the relative movements of the parts (10, 12) increasing the stresses in the adhesive film 14, and this all the more at its ends, and The bonding length.

Also, in terms of shear stresses, the following are defined: the longitudinal shear stresses connected to tensile forces/compressive forces exerted on the two parts (10, 12) but also the longitudinal shear stresses created by the deformation of the parts (10, 12) and the other aggravating factors.

Inevitably, the concentration of stresses brings about more significant deformations of the adhesive at the ends of the adhesive film 14.

Figure 3:
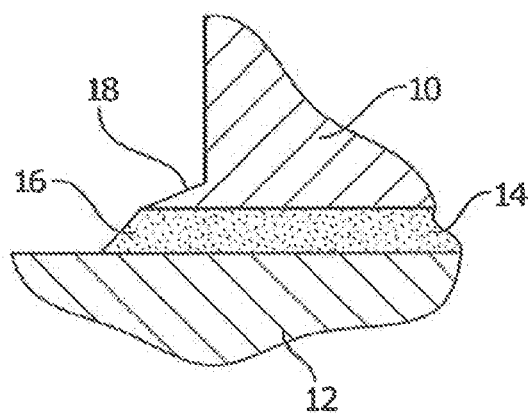
Figure 4:
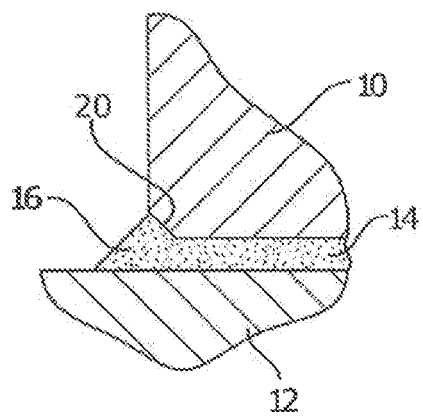

Also, so as to remedy possible detachments of the adhesive film 14, it is known to provide an overflow 16 of the adhesive film 14 at its ends or to locally equip the parts (10, 12) to be assembled with a slat 18 or a beveled edge 20 facing the ends of the adhesive film 14, as "Prior Art" FIG. 3 and "Prior Art" FIG. 4 illustrate.

So as to illustrate a problem targeted by this invention and the solution provided by the invention, reference is made to particular products used as structural parts.

These structural parts are tie rods, referred to in a general way as "connecting rods," which are arranged in a structure and which ensure the absorption of forces.

Often, these connecting rods are therefore to offer mechanical forces making it possible for them to absorb significant tensile forces and compressive forces, while withstanding buckling. So as to lighten the structure, these connecting rods should also offer a reduced weight.

To meet these objectives, the bodies of connecting rods can be manufactured starting from tubes made of composite materials, in particular produced based on carbon fibers and obtained by pultrusion. However, for the purpose of ensuring the connection of these connecting rods to the structure, the ends of these connecting rods preferably assume the shape of end fittings made of metal, and more particularly a light metal alloy such as titanium or aluminum, with these metal parts being easily machinable or able to be obtained by molding with a high degree of precision.

It is therefore necessary to ensure the connection of these metal end fittings, each at one of the two ends of a tube made of composite materials.

Figure 5A:
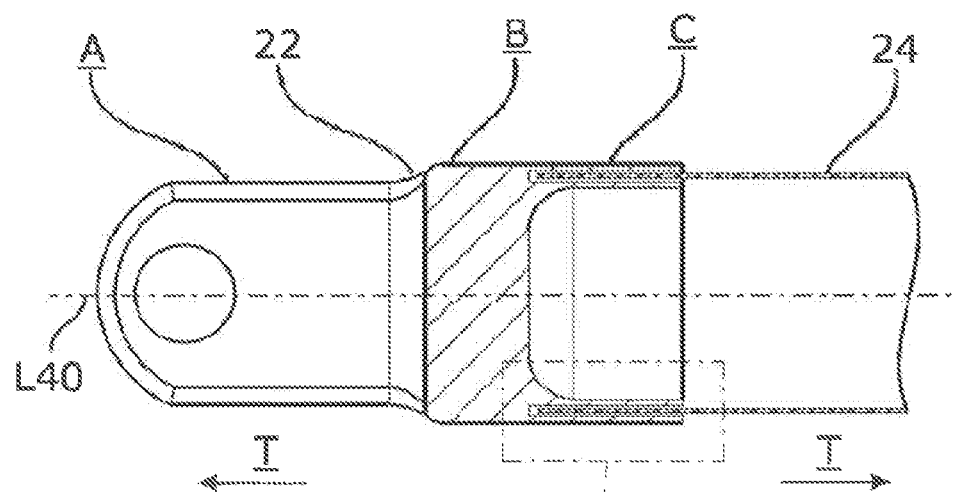
Figure 5:
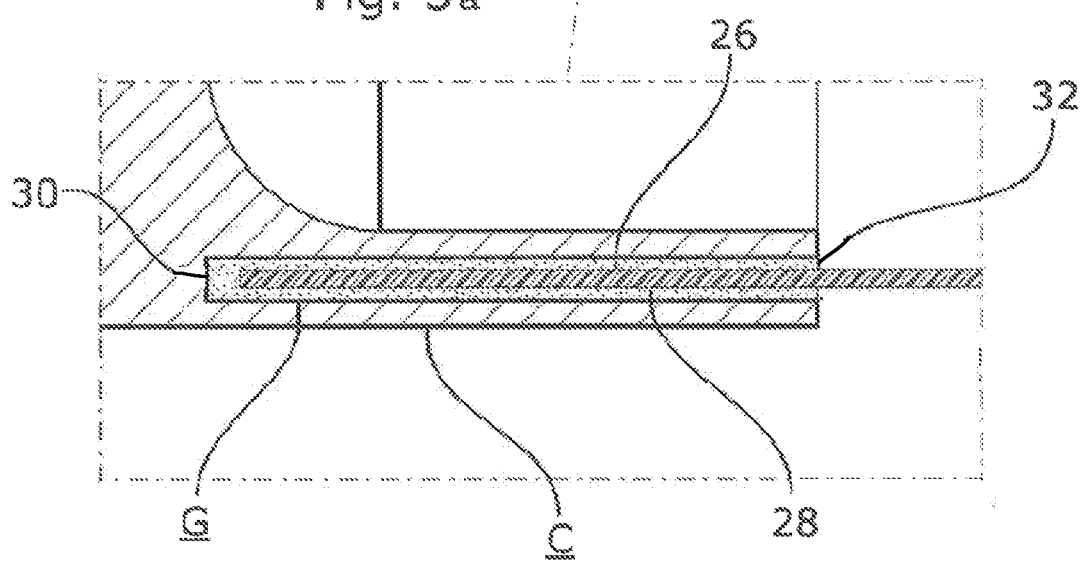

As "Prior Art" FIG. 5 illustrates, the solution that is adopted is a connection by bonding.

To produce this connection by bonding, an end fitting 22 comprises a part A with a yoke designed to be mounted with a pin, a part B designed to ensure the interface, and a part C designed to ensure the connection with a tube 24 made of composite materials.

In the example that is adopted, the part C is tubular and carries a peripheral groove G, recessed, in such a way as to accommodate one end of the tube 24 by interlocking.

The adhesive is placed in the groove in a quantity that makes it possible to fill the space between the tube and the walls of the groove and to prevent any imprisonment of bubbles.

An interior adhesive joint 26 and an exterior joint 28 are thus obtained.

Nevertheless, if this approach is satisfactory, tests or digital simulations show that a concentration of stresses occurs at certain parts of said connection when the end fitting 22 and the tube 24 are subjected to forces creating traction components T creating axial stresses that are essentially perpendicular to the assembly surface.

As in the assembly of parts (10, 12) on the parallel surfaces, a nonhomogeneous distribution of shear stresses is noted within the adhesive joints (26, 28) that can be illustrated by the typical profile shown in "Prior Art" FIG. 2.

It thus is noted that the profile of stresses in the joints (26, 28) varies with a minimum in the median part and a maximum at the ends of the joints, and even more on the free edge 30 of the tube of the end-fitting side, at the bottom of the groove, than on the free edge 32, on the tube side.

There is therefore a presence of a shear overstress facing the free edge 30, on the end-fitting side, at the bottom of the groove, and facing the free edge 32, on the tube side.

Finally, it is noted primarily that the curve, in broken lines, of the stresses in the joints (26, 28) intersects with the curve, in a continuous line, of the breaking strength of the adhesive that is constant and therefore extends beyond the breaking strength of the adhesive, which creates the breaking of the bonded connection.

Also, this invention proposes a bonding process for remedying the problems of connections by bonding according to the prior art, and for obtaining a shear stress that is as weak as possible where it is at a maximum with the connections of the prior art, and with a better distribution of these shear stresses over the length of the bonded zone so as to better stress the parts that are under low stress.

So as to obtain a connection by adequate bonding, the bonding process according to the invention is carried out in such a way that the shear stresses remain below the ultimate breaking strength of the adhesive.

For this purpose, the invention has as its object a process for the production of a connection that is bonded between a first part and a second part, with a length of superposition around a longitudinal axis, these parts being subjected to forces in at least one longitudinal direction, the process consisting in producing a bonded connection comprising at least one interior adhesive joint and/or one exterior adhesive joint, over at least one part of the length between the said two parts, such a joint having a closed or semi-closed cross-section around the longitudinal axis of the connection with the thickness of an adhesive joint varying from a free edge, on the end-fitting side, to the other free edge, on the tube side, of said joint and following the direction of forces to which the first and second parts are subjected in such a way as to better distribute the overstresses over the at least one part of said length.

According to the invention, the process is characterized in that at least one adhesive joint is produced, having, in the axial direction of the forces, a thickness that is greater facing each of its two free edges relative to the thickness of said at least one adhesive joint in its median part.

Finally, this invention also covers assemblies made using this bonding process, such as an end fitting and a tube connected with such a bonded connection, and a connecting rod comprising an end fitting and a tube connected with such a bonded connection.

The bonding process is now described in detail according to a particular nonlimiting embodiment, with the different figures showing:

Prior Art FIG. 1: A diagrammatic view of a bonded connection between two parts on essentially parallel surfaces of the prior art, Prior Art FIG. 2: A general diagrammatic curve of the values of the shear stresses, in the prior art, relative to the breaking strength of the adhesive, Prior Art FIGS. 3 and 4: Detail views of known solutions whose purpose is to prevent the detachment of the ends of the bonded connections according to the prior art, Prior Art FIG. 5: A diagrammatic view of a bonded connection of an end fitting on a tube made of composite materials, according to the prior art, FIG. 6: A diagrammatic cutaway view along a longitudinal median plane of a bonded connection of an end fitting on a tube made of composite materials, according to the invention, and with adhesive joints having a gradual and non-linear variation in thickness, FIG. 7: A view of the general curve of values of the shear stresses relative to the breaking strength of the adhesive in a bonded connection according to this invention, FIG. 8: A diagrammatic cutaway view along a longitudinal median plane of a bonded connection of an end fitting on a tube made of composite materials, according to the invention, and with adhesive joints having linear variations in thickness, and FIG. 9: A diagrammatic cutaway view along a longitudinal median plane of a bonded connection of an end fitting on a tube made of composite materials according to the invention and with an end fitting that has reductions in thickness on the free edges of the joints located on the tube side.

In Prior Art FIG. 2, it is noted that the curve, in broken lines, of the shear values intersects with the curve, in a continuous line, of the breaking strength of the adhesive, and this at the two ends at I1 and I2.

It is therefore noted that the strength of the bonded connection when it undergoes tensile/compressive forces is determined by these values at points of intersections I1 and I2.

However, it appears necessary that the overstress values in the bonded connection remain below the strength performance levels of the adhesive.

The strength of the mounting is thus defined by the strength of the bonded connection that is less than the breaking strength of said adhesive.

In the table below, which combines the values measured at ambient temperature, +20° C., the numbered variations of the shear stresses created in the adhesive joints (26, 28) of the assembly of a tube 24 with an end fitting 22 according to the prior art are noted, in the median part and at the ends, for example with an epoxy-resin-based adhesive for a tensile force of 154 kN, applied on a carbon tube with a diameter of 60 mm, with the assumed bonding length being 50 mm.

TABLE 1

| (+20° C.): | | | | | |
|---|---|---|---|---|---|
| Interior Adhesive Joint | | | Exterior Adhesive Joint | | |
| Free Edge on the End-Fitting Side | Median Part | Free Edge on the Tube Side | Free Edge on the End-Fitting Side | Median Part | Free Edge on the Tube Side |
| 33.3 MPa | 3.2 MPa | 14.5 MPa | 27.0 MPa | 3.3 MPa | 11.9 MPa |

When the temperature varies greatly, positively or negatively, the values are significantly modified, which limits even more the strength values of the bonded connection, by increasing the overstresses created on the edges (30, 32) of the joints (26, 28) and in particular on the end-fitting side, at the bottom of the groove.

In addition, as indicated in the preamble, the differential expansion acts as an additional shear stress, in the same way as the traction that is exerted on the two parts (22, 24).

Figure 6A:
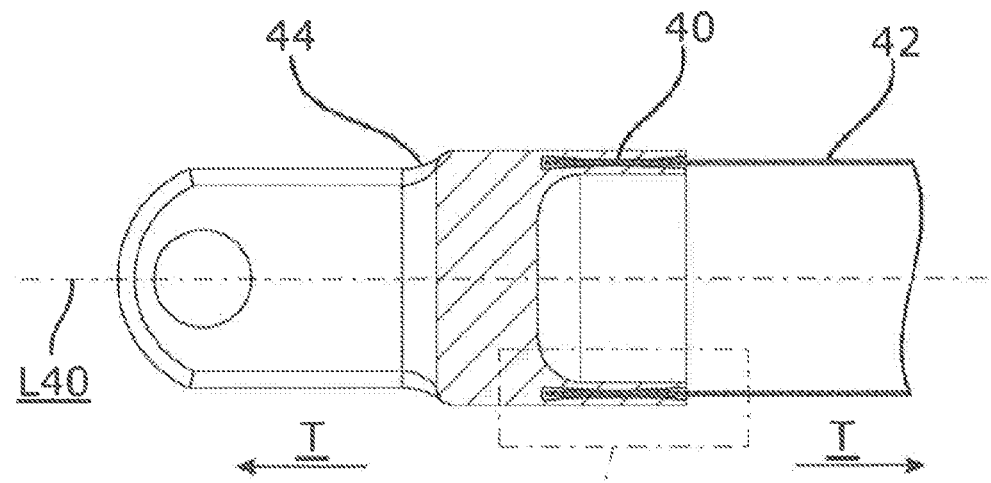
Figure 6:
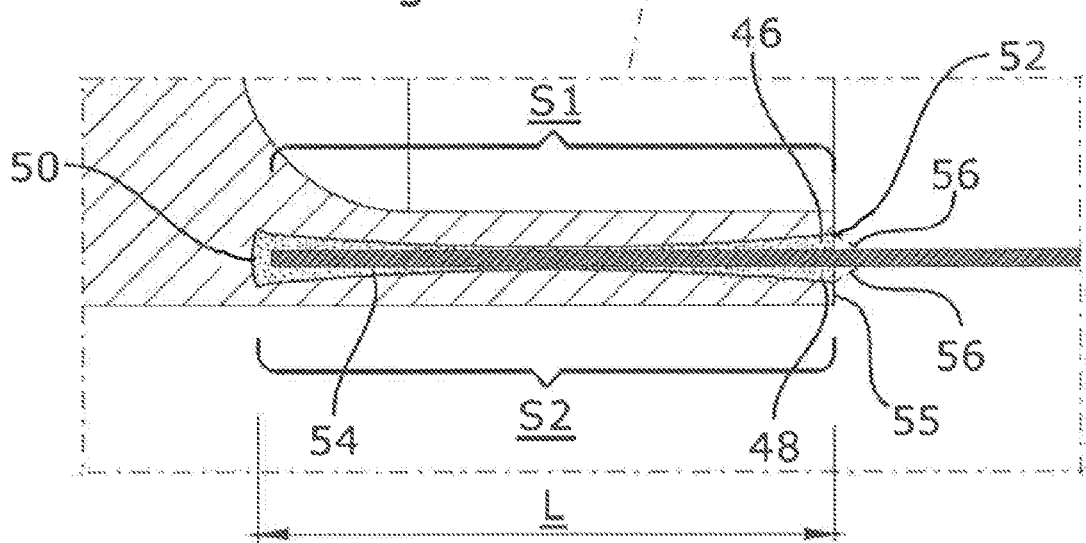

According to this invention, and as illustrated in FIG. 6, in the case of a bonded connection 40, designed to assemble a tube 42 and an end fitting 44, the end fitting 44 comprises, in a known way, a peripheral groove 54, recessed, in such a way as to accommodate by interlocking one end of the tube 42. The invention defines the peripheral groove 54 as a groove 54 that is hollowed out in the inside annular field 55, on the tube side, of the end fitting 44, and in a direction that is parallel to the longitudinal axis L40 of the connection 40.

Next, the invention provides at least one interior adhesive joint 46 and/or an exterior adhesive joint 48 whose thickness is variable with a free edge 50, on the end-fitting side, and with the other free edge 52, on the tube side, of said joints (46, 48).

Preferably, the bonded connection 40 comprises an interior adhesive joint 46 and an exterior adhesive joint 48, with the end fitting 44 and the tube 42 comprising two surfaces (S1, S2) that are bonded to one another.

Preferably, the bonded surfaces (S1, S2) of the connection 40 extend over the entire length of the superposition L between the end fitting 44 and the tube 42 and around a longitudinal axis L40.

According to this invention, the joints (46, 48) have thicknesses that are increased at the free edges (50, 52) of the joints, and preferably an increased thickness on the end-fitting side 50, at the bottom of the groove, which is larger than the increased thickness on the tube side 52.

Thus, the joints (46, 48) are reduced at the median part.

To obtain such a result, the groove 54, for example, is machined in the end fitting 44 in such a way as to create a housing with variable thickness, and the adhesive to be retained is injected.

Preferably, the end fitting 44 and the tube 42 having cylindrical cross-sections, the bonded surfaces (S1, S2), and the joints (46, 48) are also cylindrical.

However, as a variant, the end fitting 44 and the tube 42 could also have other closed or semi-closed cross-sections around the longitudinal axis L40 of the connection 40, such as, for example, elliptical cross-sections in a U, a W, and an I or according to any open or closed polygon.

The invention defines closed cross-sections or semi-closed cross-sections as any cross-section that imparts a non-plane volume to the end fitting 44 and to the tube 42 around the longitudinal axis L40, i.e., a volume with at least one open or closed hollow part, along the longitudinal axis L40.

Also, and regardless of the closed or semi-closed cross-section of the end fitting 44 and the tube 42 around the longitudinal axis L40, the joints (46, 48) also have a closed or semi-closed cross-section around the longitudinal axis L40.

Preferably, the joints (46, 48) have closed or semi-closed cross-sections of profiles that are essentially identical to the closed or semi-closed cross-sections of the end fitting 44 and the tube 42 around the longitudinal axis L40 of the connection 40.

Advantageously, the thickness variation of the adhesive joints (46, 48) provided by the invention makes it possible to reduce the gradient of the shear overstresses.

This result is furthermore illustrated by Table 2 below, providing results of tests or simulations obtained with a connection 40 according to the invention when the end fitting 44 and the tube 42 are under the action of axial components of traction T, with these results being to be compared with those provided in Table 1.

The conditions are strictly identical except for the bonding length that is reduced.

Actually, regarding the performances of the bonded connection 40 according to the invention, it is possible to reduce the length of the adhesive joints (46, 48).

This reduction in length also contributes to improving the connection 40 because the shear stresses created by the differential expansions connected to the different nature of the materials are also reduced.

TABLE 2

| Interior Adhesive Joint | | | Exterior Adhesive Joint | | |
|---|---|---|---|---|---|
| (+20° C.) | | | | | |
| Thickness 1.1 mm Free Edge on the End-Fitting Side | Thickness 0.4 mm Median Part | Thickness 1.3 mm Free Edge on the Tube Side | Thickness 1.3 mm Free Edge on the End-Fitting Side | Thickness 0.4 mm Median Part | Thickness 1.3 mm Free Edge on the Tube Side |
| 16.6 MPa | 6.1 MPa | 13.4 MPa | 24.1 MPa | 6.9 MPa | 10.3 MPa |

The adhesive joints (44, 48), of reduced length, additionally work in a more homogeneous way, and their median part now ensures a more significant absorption of forces.

The distribution is therefore better, and the maximum values are reduced.

Figure 7:
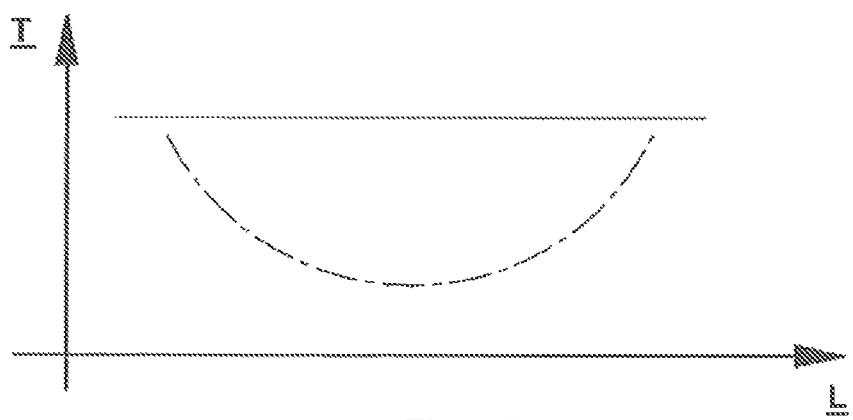

It is thus that over the diagrammatic curve of FIG. 7, it is noted that there are no more intersections and that the maximum values of the axial shear stresses therefore remain lower than the breaking strength of the adhesive.

The bonded connection 40 now works in an optimized way since the maximum breaking strength of the adhesive is not exceeded.

According to an improvement in the invention, illustrated in broken lines in FIG. 6, it is possible to extend the adhesive joints (46, 48) beyond the end fitting 44 and the superposition length L between the tube 42 and the end fitting 44. Such extensions 56 can be in the form of a lip, or beveled, owing to a lost shaping ring.

These extensions 56 make it possible to extend the diffusion of stresses beyond the superposition of the two parts (42, 44).

According to another improvement, with the shear overstress being more significant facing the free edge 50, on the end-fitting side at the bottom of the groove, than facing the free edge 52, on the tube side, the thickness variation is such that the interior and exterior adhesive joints (46, 48) are thicker facing the free edge 50, on the end-fitting side, than facing the free edge 52, on the tube side.

Figure 9:
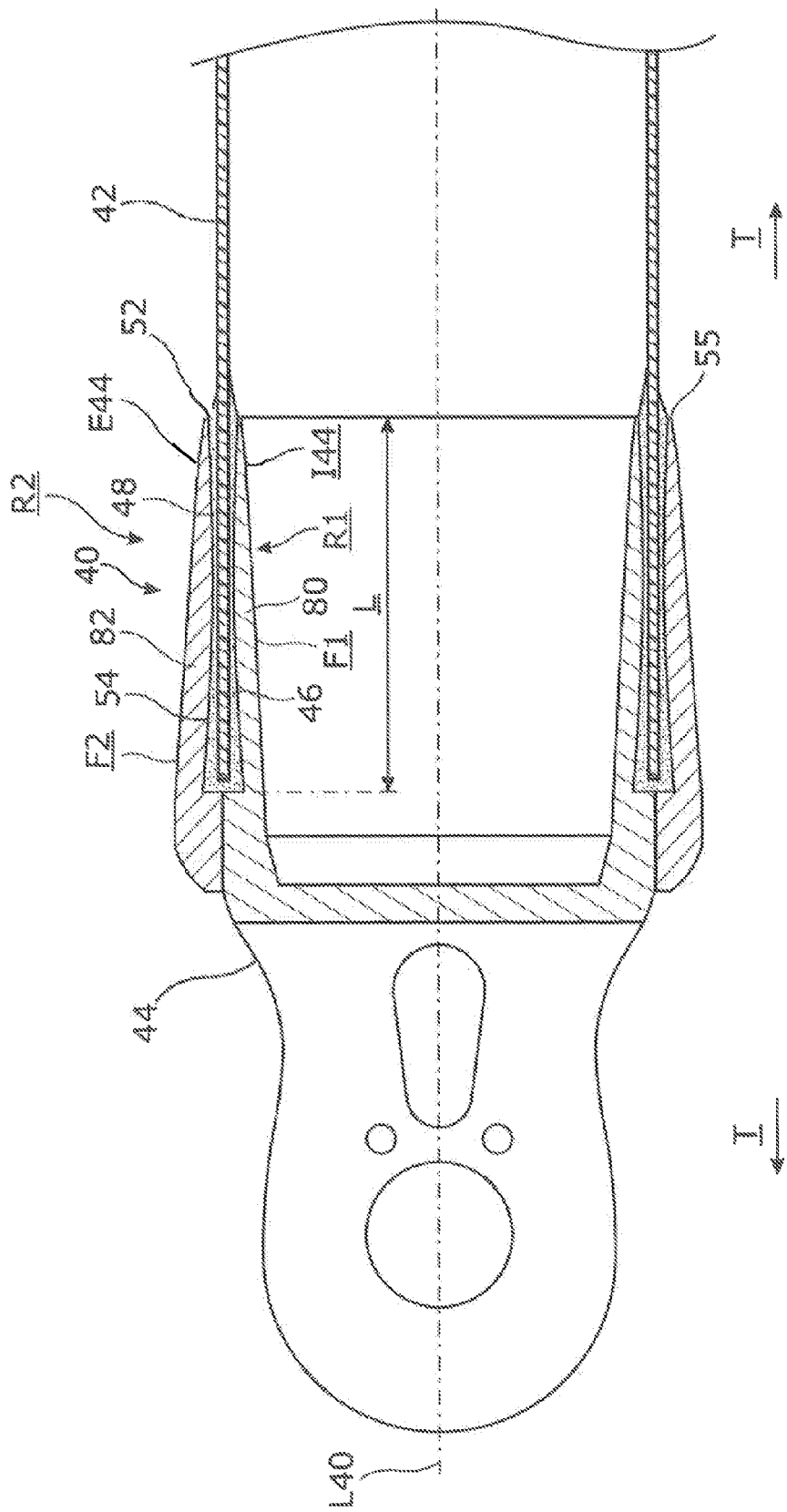

Preferably and as in the examples shown in FIG. 6 or in FIG. 9, the bonded connection 40 comprises an interior adhesive joint 46 and an exterior adhesive joint 48, and the two adhesive joints (46, 48) follow a gradual and non-linear variation of thickness between their free edge 50, on the end-fitting side, and their other free edge 52, on the tube side.

As a variant, only an adhesive joint (46, 48) of the bonded connection 40 could follow a gradual and non-linear variation of thickness between its free edge 50, on the end-fitting side, and its other free edge 52, on the tube side.

The invention defines a gradual and non-linear variation as a variation, along a curved profile and without pause, from the free edge 50 to the free edge 52.

According to the invention, this non-linear thickness variation is preferred because it better corresponds to the ideal variation profile obtained after a digital modeling of the bonded connection 40 and the different finite-element calculations simulating the behavior of the parts (42, 44) and the bonded connection 40 under forces.

However, this non-linear thickness variation makes the machining of the groove 54 in the end fitting 44 more difficult.

Figure 8:
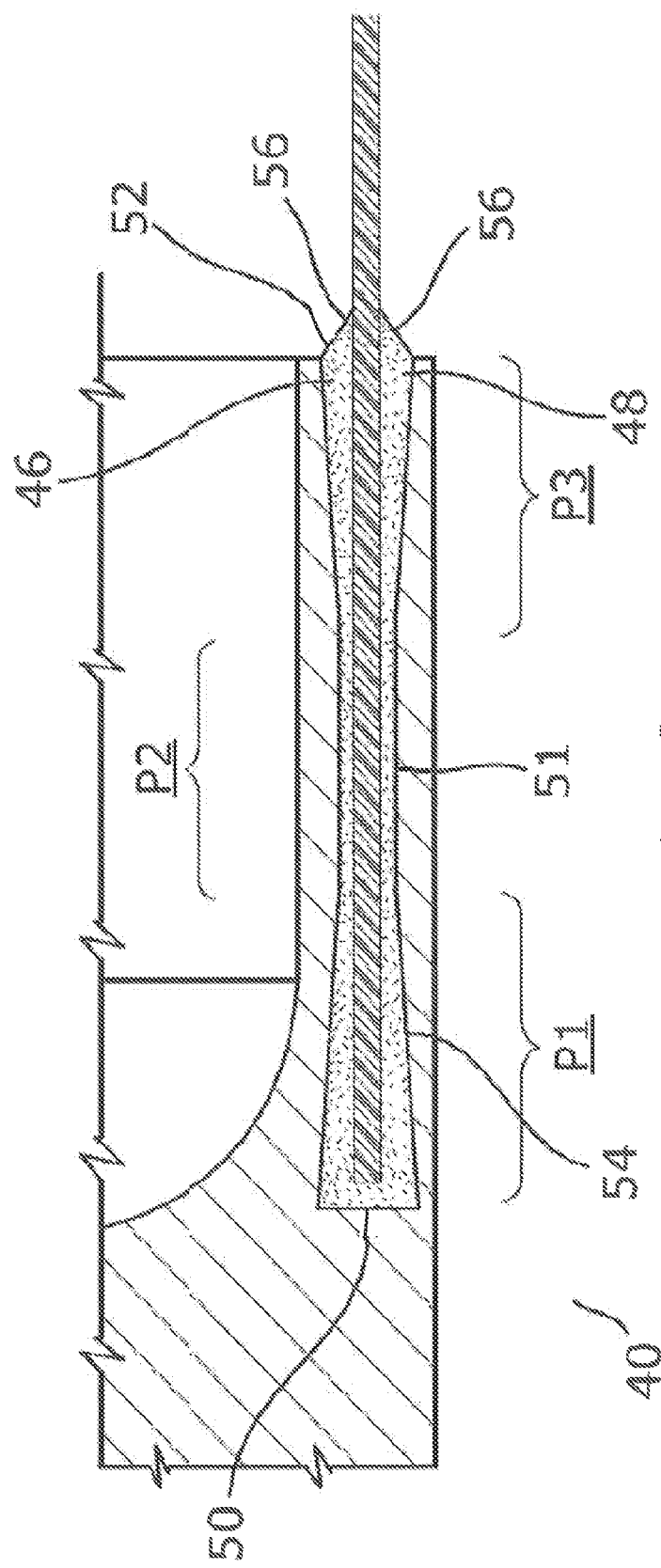

Also, and as in the example shown in FIG. 8, the two adhesive joints (46, 48) of the bonded connection 40 can follow linear thickness variations between the free edge 50, on the end-fitting side, and the other free edge 52, on the tube side.

As above, only an adhesive joint (46, 48) of the bonded connection 40 could follow linear thickness variations between its free edge 50, on the end-fitting side, and its other free edge 52, on the tube side.

In more detail, in a first portion P1 located between its free edge 50, on the end-fitting side, and its median part 51, the thickness of an adhesive joint (46, 48) decreases linearly.

Then, in a second portion P2 corresponding essentially to its median part 51, the thickness of an adhesive joint (46, 48) remains essentially constant.

And, in a third portion P3 located between its median part 51 and its other free edge 52, on the tube side, the thickness of an adhesive joint (46, 48) increases linearly.

Advantageously, these linear thickness variations of the adhesive joints (46, 48) facilitate the machining of the groove 54 in the end fitting 44.

According to another improvement of a bonded connection 40 illustrated in FIG. 9, the invention provides at least one outside reduction of thickness R1, R2 of the end fitting 44 facing the free edge 52, on the tube side, of at least one joint (46, 48).

The invention defines an outside reduction of thickness R1, R2 of the end fitting 44 as a reduction made on the surfaces F1, F2 of the end fitting 44 outside of the bonded connection 40 and therefore not glued.

Preferably, with the bonded connection 40 comprising an interior adhesive joint 46 and an exterior adhesive joint 48, the end fitting 44 comprises an outside end E44 of reduced thickness facing the free edge 52, on the tube side, of the exterior joint 48, and an inside end I44 of reduced thickness facing the free edge 52, on the tube side, of the interior joint 46.

Preferably, the closer one gets to the free edge 52, on the tube side, of a joint (46, 48), the more the thickness R1, R2 of the end fitting 44 is reduced.

Ideally, the outside end E44 and the inside end I44 offer a gradual outside reduction of thickness R1, R2, i.e., without pause.

However, because of limits imposed by machining means and the material that is machined, these outside reductions of thickness R1, R2, and therefore the end fitting 44, can be terminated by a beveled edge followed by a shoulder.

With the end fitting 44 comprising an inside skirt 80 and an outside ring 82 between which the groove 54 is provided, the inside skirt 80 and the outside ring 82 of the end fitting 44 each have an outside reduction of thickness R1, R2 facing the free edge 52 of the joints (46, 48).

These outside reductions of thicknesses R1, R2 make it possible to reduce the rigidity and to provide the flexibility to the bonded parts of the end fitting 44 facing the free edge 52 of the joints (46, 48), or to the outside end E44 and the inside end I44 of the end fitting 44, this so as to reduce the stresses of the end fitting 44 on the joints (46, 48) facing their free edge 52 when the end fitting 44 and the tube 42 are under the action of axial components of traction T.

Thus, the maximum shear stresses noted in the free edge 52 of the joints (46, 48) are reduced, and the distribution of the stresses in the adhesive joints (46, 48) is improved when the end fitting 44 and the tube 42 are subjected to tensile stress.

In a general manner, the process for production of a connection by bonding 40 according to the invention between a first part (42, 62) and a second part (44, 64) with a superposition length L, and subjected to forces T in at least one axial direction, consists in producing at least one adhesive joint (46, 48) on at least one part of the length L between the two said parts, this at least one joint (46, 48) having a variable thickness following the direction of the forces to which the first and second parts are subjected.

The process according to the invention also provides for producing at least one adhesive joint (46, 48) that has, in the longitudinal direction of the forces, a thickness that is greater facing each of the two free edges (50, 52) of said joint relative to the median zone, in the axial direction of the forces T.

The thickness variation provided by the invention supplies a progressiveness in the rigidity of the adhesive joint (46, 48) in such a way that the end zones, where the relative deformations of the two parts to be assembled (42, 44) are at a maximum, constitute adhesive joint portions that are more flexible, and in such a way that the central zone, made thinner, constitutes a more rigid portion of the joint.

Thus, the shear stresses are proportionally lower in the end zones, while the central zone receives a proportionally larger fraction of tensile forces T between the two parts.

For certain particular bonded connections, the process according to the invention consists in producing a thickness variation such that the adhesive joint (46, 48) facing a free edge (50) is thicker than the adhesive joint (46, 48) facing the other free edge (52) of said joint.

Within the framework of the production of a bonded connection 40 between a tube 42 and an end fitting 44, with the bonded connection 40 comprising at least one interior adhesive joint 46 and/or one exterior adhesive joint 48 whose thickness is variable from one free edge 50, on the end-fitting side, to the other free edge 52, on the tube side, of said joints (46, 48), the process according to the invention consists in machining a groove 54 in the end fitting 44 according to the desired thickness variation profile of the adhesive joint(s) (46, 48), in introducing the tube 42 into the end fitting 44, and in injecting the adhesive into the groove 54 by preventing the introduction of air bubbles.

Advantageously, it is noted that the process is perfectly applicable in exactly the same way to a bonded connection between two parts with an open profile or between parts without a rotational shape.

The process according to the invention is preferably adapted to the production of a bonded connection 40 between a metal end fitting 44 and a tube 42 made of composite materials for the purpose of the manufacturing of a connecting rod, with two end fittings 44 being connected to the two ends of a tube 42 by means of bonded connections 40 for forming a connecting rod.

Of course, the invention covers a connecting rod comprising at least one end fitting 44, preferably metal, connected to a tube 42, preferably made of composite materials, with at least one bonded connection 40 according to the invention.

According to the invention, such a connecting rod is designed for an aeronautical use and the production of aircraft structures.

However, the process according to the invention could also be adapted to the production of any structural connecting rod or a connection between a wind turbine blade and the wind turbine rotor, with the blade able to comprise a cylindrical base to be attached to a cylindrical end fitting that is integral with the wind turbine rotor.

Also, the process according to the invention could also be applicable to a bonded connection between two parts made of composite materials or between two metal parts.

Finally, it should be noted that the invention relates to the production of an assembly by a bonded connection 40 between rigid parts (40, 42), i.e., whose modulus of elasticity is greater than 50 GPa.

The invention claimed is:

1. A process for production of a bonded connection between a tube and an end fitting, with a length of superposition around a longitudinal axis of the tube and the end fitting, the tube and the end fitting being subjected to forces in at least one longitudinal direction, the process comprising:
    producing the bonded connection comprising at least one adhesive joint over at least one part of a length between the tube and the end fitting,
    said at least one adhesive joint comprising at least one of the group consisting of i) an interior adhesive joint and ii) an exterior adhesive joint over the at least one part of the length between the tube and the end fitting,
    said at least one adhesive joint having a closed or semi-closed cross-section around the longitudinal axis of the connection,
    a thickness of said at least one adhesive joint varying from a first free edge on an end-fitting side, to a second free edge on a tube side of said at least one adhesive joint and following a direction of forces to which the tube and the end fitting are subjected in such a way as to better distribute overstresses over the at least one part of said length between the tube and the end fitting,
    wherein at least one adhesive joint is produced, having, in the longitudinal direction being subjected to the forces, a larger thickness facing each of said first and second free edges relative to a thickness of said at least one adhesive joint in a median part said at least one adhesive joint.

2. The process for the production of a bonded connection between the tube and the end fitting according to claim 1, wherein the tube and the end fitting have different modulus of elasticity and coefficient of thermal expansion.

3. The process for the production of a bonded connection between the tube and the end fitting according to claim 2, further comprising a step of interlocking the tube in a groove of the end fitting.

4. The process for the production of a bonded connection between the tube and the end fitting according to claim 3, wherein said at least one adhesive joint of the bonded connection follows a gradual and non-linear variation of thickness between said two free edges.

5. The process for the production of a bonded connection between the tube and the end fitting according to claim 4, wherein with the least one adhesive joint of the connection comprises both the interior adhesive joint and the exterior adhesive joint, the interior and exterior adhesive joints following a gradual and non-linear variation of thickness between said first and second free edges.

6. The process for the production of a bonded connection between the tube and the end fitting according to claim 1, wherein at least one adhesive joint follows linear variations of thickness between said first and second free edges with the thickness of the adhesive joint decreasing linearly in a first portion located between a first free edge and said median part, with the thickness of the adhesive joint remaining constant in a second portion corresponding to said median part, and the thickness of the adhesive joint increasing linearly in a third portion located between said median part and said second free edge.

7. The process for the production of a bonded connection between the tube and the end fitting according to claim 1, further comprising a step of providing an outside reduction of thickness of at least one part facing at least one of the first and second free edges of the at least one adhesive joint.

8. The process for the production of a bonded connection between the tube and the end fitting according to claim 1, wherein at least one adhesive joint is projecting outside of the bonded connection that is produced.

9. The process for the production of a bonded connection between the tube and the end according to claim 1, comprising the further step of producing a thickness variation such that at least one adhesive joint is thicker facing a first free edge than facing the second free edge.

10. The process for the production of a bonded connection between the tube and the end according to claim 1, comprising a further step of machining a groove in the end fitting according to the desired thickness variation profile of the at least one adhesive joint, inserting the tube into the end fitting, and in injecting an adhesive into the groove by preventing the introduction of air bubbles.

11. A connecting rod, comprising
a tube and an end fitting having at least one bonded surface between the tube and the end fitting,
with the end fitting comprising a peripheral groove, recessed, and accommodating by interlocking one end of the tube over a superposition length,
the tube and the end fitting being connected by a connection comprised of at least one bonded connection comprising at a least one adhesive joint over at least one part of a length between the tube and the end fitting and around a longitudinal axis of the connection,
said at least one adhesive joint comprising at least one of the group consisting of i) an interior adhesive joint and ii) an exterior adhesive joint over the at least one part of the length between the tube and the end fitting,
said at least one adhesive joint having a closed or semi-closed cross-section around the longitudinal axis of the connection,
a thickness of the at least one adhesive joint varying from a first edge on an end-fitting side to a second free edge on a tube side, of said one least one adhesive joint,
wherein said at least one adhesive joint has a larger thickness facing each of said first and second free edges relative to a thickness in a median part of said at least one adhesive joint.

12. The connecting rod according to claim 11, wherein at least one adhesive joint follows a gradual and non-linear variation of thickness between said first and second free edges.

13. The connecting rod according to claim 12, wherein with the least one adhesive joint of the bonded connection comprises both the interior adhesive joint and the exterior adhesive joint, the interior and exterior adhesive joints following a gradual and non-linear thickness variation between the first and second free edges.

14. The connecting rod according to claim 11, wherein the at least one adhesive joint follows linear variations of thickness between said first and second free edges, with the thickness of the at least one adhesive joint decreasing linearly in a first portion located between the first free edge and said median part, with the thickness of the at least one adhesive joint remaining constant in a second portion corresponding to said median part, and the thickness of the at least one adhesive joint increasing linearly in a third portion located between said median part and said second free edge.

15. The connecting rod according to claim 11, wherein the end fitting comprises at least one outside reduction of thickness facing the second free edge on the tube side of the at least one adhesive joint.

16. The connecting rod according to claim 11, wherein with the least one adhesive joint of the connection comprises both the interior adhesive joint and the exterior adhesive joint, the end fitting comprises an outside end of reduced thickness facing the second free edge on the tube side, and an interior end of reduced thickness facing the second free edge on the tube side of the interior joint.

17. The connecting rod according to claim 11, wherein at least one adhesive joint comprises an extension to at least one of said first and second free edges.

18. The connecting rod according to claim 11, wherein the at least one adhesive joint is thicker facing the first free edge than facing the second free edge.

19. The connecting rod according to claim 11, wherein the tube is made of composite material.

* * * * *